United States Patent [19]
Pfenninger et al.

[11] Patent Number: 4,559,144
[45] Date of Patent: Dec. 17, 1985

[54] PROCESS FOR CONVERTING SPARINGLY SOLUBLE INORGANIC SALTS OF CATIONIC DYES AND BRIGHTENERS INTO MORE SOLUBLE SALTS OF ORGANIC ACIDS

[75] Inventors: Heinz Pfenninger, Lupsingen; Beat Bruttel, Böckten, both of Switzerland

[73] Assignee: Ciba Geigy Corporation, Ardsley, N.Y.

[21] Appl. No.: 503,484

[22] Filed: Jun. 13, 1983

[30] Foreign Application Priority Data

Jun. 15, 1982 [CH] Switzerland .......................... 3691/82

[51] Int. Cl.⁴ ............................................. B01D 13/00
[52] U.S. Cl. .................................... 210/638; 210/641
[58] Field of Search ................ 204/151; 210/644, 641, 210/638, 648; 8/438, 440, 648, 657, 659, 677

[56] References Cited

U.S. PATENT DOCUMENTS

4,095,943  6/1978  Lang .......................................... 8/92
4,306,946 12/1981  Kim ................................. 210/644 X

OTHER PUBLICATIONS

S. T. Hwang and K. Kammermayer, "Membranes in Separation", Wiley & Sons (1975) pp. 166-173.

*Primary Examiner*—Frank Spear
*Attorney, Agent, or Firm*—Edward McC. Roberts; Kevin T. Mansfield; Irving M. Fishman

[57] ABSTRACT

A process is described for converting sparingly soluble inorganic salts of cationic dyes and brighteners into more soluble salts of organic acids without intermediate isolation of the free base, wherein the counter-ion of the dye or brightener cation is replaced by the anion of a cyclic or acyclic organic acid by means of Donnan dialysis.

Dye or brightener solutions obtained in this way are stable and can be directly used for dyeing or printing textile materials.

11 Claims, 1 Drawing Figure

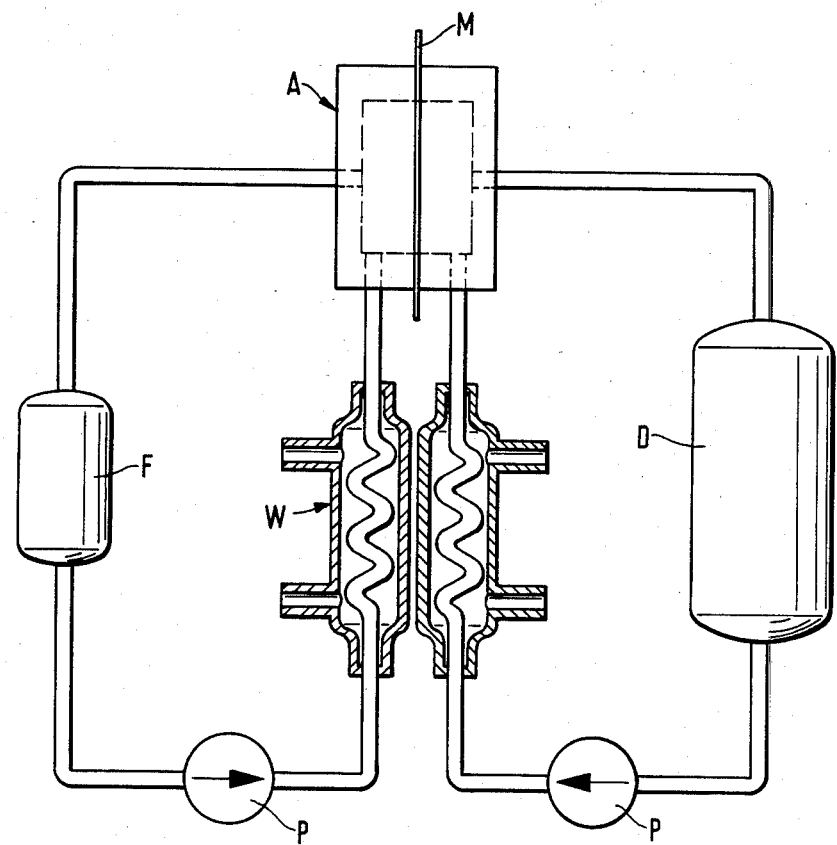

PROCESS FOR CONVERTING SPARINGLY SOLUBLE INORGANIC SALTS OF CATIONIC DYES AND BRIGHTENERS INTO MORE SOLUBLE SALTS OF ORGANIC ACIDS

SUMMARY OF THE INVENTION

The invention relates to a process for converting sparingly soluble inorganic salts of cationic dyes and brighteners into more soluble salts of organic acids, to the concentrated dye or brightener solutions obtained by means of this process and to their use in preparing solid or liquid dye preparations.

BACKGROUND OF THE INVENTION

The solubility in water or organic solvents of salts of cationic dyes and fluorescent brighteners depends not only on the dye or brightener cation, but especially also on the anion. For instance, the dye or brightener salts generally obtained on synthesis are in many cases not readily water-soluble; they are salts of inorganic acids, for example chlorides, sulfates or methosulfates. However, as salts of organic acids (for example as acetates) the same dyes or brighteners are significantly more water-soluble.

To prepare concentrated dye or brightener solutions, which are becoming commercially increasingly important as liquid brands, it is necessary to have dye or brightener salts which are readily water-soluble, since it is only in this way that the solvent content in the preparations can be kept as low as possible. But a high solubility of the dye or brightener is also of advantage in preparing solid preparations, since it makes possible a gentle and energy-saving drying, because highly concentrated starting solutions can be used.

In the past there has been no shortage of attempts to replace the anions of sparingly soluble cationic dye or brightener salts by the acid radical of carboxylic acids and thus to increase the water-solubility of the salts. For example, German Offenlegungsschrift No. 2,549,436 gives a process in which the inorganic acid radical of cationic dye salts is chemically bonded by means of epoxides. This chemical conversion is carried out in the presence of lower aliphatic carboxylic acids, the acid radical of which acts as a counterion and takes the place of the bonded anion. This process converts a dye chloride, for example, by means of epichlorohydrin in the presence of acetic acid into the corresponding dye acetate, and the epichlorohydrin is turned into propylenechlorohydrin.

This process has the disadvantage that the replaced anion becomes bonded in the form of an organic compound which cannot be put to any further use, and thus represents a loss of valuable organic material. The replacement of the anion by chemical means is also an additional reaction step, and hence, at the least, gives rise to the formation of undesirable by-products.

It is thus an object of the invention to find a process free of these disadvantages, i.e. to develop a process which can be carried out without problems and which has no adverse effect on the quality of the dye nor gives rise to useless organic products.

This object is surprisingly achieved with the aid of a membrane-separating process by means of Donnan dialysis (on the theory of the Donnan dialysis see S. T. Hwang and K. Kammermeyer, Membranes in Separations; Wiley & Sons, N.Y. 1975).

The present invention thus relates to a process for converting inorganic salts, such as the chlorides, sulfates or methosulfates, of cationic dyes and brighteners into more soluble salts of organic acids without intermediate isolation of the free base, which comprises replacing the inorganic acid radical of the dye or brightener by the anion of a cyclic or acyclic organic acid by means of Donnan dialysis.

DETAILED DESCRIPTION OF THE INVENTION

The Donnan dialysis is advantageously carried out in an exchange cell which is divided by a semipermeable membrane into two chambers which each have an inlet opening tangential to the surface of the membrane and a central outlet opening. During the exchange process, not only the dye or brightener solution or suspension but also the dialysis solution are pumped by means of a pump out of a supply vessel through the exchange cell and back into the supply vessel, thereby completing the cycle. In the exchange process, the forced circulation through the exchange cell should preferably be controlled in such a way that the solutions or the suspension flow(s) past the membrane as turbulently as possible.

The energy introduced into the closed system by the pumps, which is measurable as a temperature increase, can, if appropriate, be conducted away by means of heat exchangers.

DESCRIPTION OF THE DRAWING

The FIGURE shows a diagram of the apparatus with which the process of the invention is carried out. The supply vessel F contains the dye or brightener solution or suspension and the supply vessel D contains the dialysis solution. With the pumps P the dye or brightener solution (or suspension) and the dialysis solution, respectively, are pumped through the respective compartments of the exchange cell a past the ion exchange membrane M and back into the supply vessels. The exchange cell has an inlet opening tangential to the surface of the membrane and a central outlet opening. The two streams of liquid are cooled, if necessary, by means of the heat exchangers W.

Donnan dialysis is a membrane process carried out without the application of pressure. The membranes used have the property of being permeable both to the counter-ion of the dye or brightener cation and to the anion of the dialysis solution, but of hardly allowing the cation of the dialysis solution to pass through and the dye or brightener cation not at all.

The membranes are anion exchange membranes whose polymer backbone has been modified with polyfunctional compounds containing cationic groups and whose pores have a diameter of 0.1 to 50 μm.

The polymer backbone of the membrane consists of natural, cellulosic or synthetic materials which contain as reactive groups, for example, hydroxyl, amino and/or amidoxime groups. Materials of this type can be reacted with suitable reagents which contain cationic groups on the one hand and at least one reactive grouping capable of forming a chemical (covalent) bond on the other.

Examples of polymeric compounds which can be modified in the above manner are the following:

cellulose acetate, for example those having a low acetyl group content, but also cellulose with a higher degree of acylation, for example secondary rayon acetate, or polyvinyl alcohols, or polyvinyl chloride,
polyacrylonitrile and copolymers of acrylonitrile and other ethylenically unsaturated monomers.

A compound used as a reactive reagent which contains a cationic group can be colourless or coloured. Examples of cationic groups are the ammonium, phosphonium and sulfonium groups.

However, it is also possible to use membranes whose backbone consists of an inert polymer, for example polyester or polyethylene, which has been coated with an exchange resin. To prepare such membranes, either a finished exchange resin which already contains cationic groups is applied to the polymeric support or the exchange resin is only polymerised when on the support and is then modified by conventional methods, for example by quaternising the amino groups.

It is also possible to use membranes which have been modified not only with cationic groups but also with anionic groups, provided there are more cationic groups than anionic groups. Examples of anionic groups are the sulfato, sulfonic acid and carboxylic acid groups.

At the start of the process membranes of both types give ion exchange rates of up to 50 mols, based on 1 m$^2$ of membrane area and one day of operation.

The treatment of dye or brightener chlorides, in particular, leads to almost complete ion exchange. For instance, the mean chloride ion concentration after an operating period of 2 to 3 days, depending on the membrane area, is of the order of about 0.01 mol per liter.

Donnan dialysis can exchange, for example, the anions of the following water-soluble cationic dyes: chlorides, sulfates and methosulfates of methine and azamethine dyes which can contain a great variety of heterocyclic rings, and of dyes of the diphenylmethane, triphenylmethane, oxazine, thiazine and 1,2-pyrone series and of dye salts of the arylazo and anthraquinone series having an external onium group, for example the ammonium or hydrazinium group. Cationic fluorescent brighteners belong, for example, to the following classes: stilbene, coumarin, pyrazine, pyrazoline, oxazine, oxazolyl, imidazolyl and napthalimide derivatives.

The dialysis solution used is advantageously an aqueous solution of an inorganic salt of a cyclic or acyclic organic monocarboxylic or polycarboxylic acid which can be substituted by hydroxyl, halogen, $C_1$–$C_4$-alkoxy, nitro, amino, $C_1$–$C_4$-alkyl (in the case of aromatic acids), cyano or oxo groups. Suitable solutions are, for example, the aqueous solutions of the salts of the following acids: saturated unsubstituted monocarboxylic acids, such as formic acid, acetic acid, propionic acid, n-valeriac acid or caproic acid, substituted lower monocarboxylic acids, such as glycolic acid or lactic acid, halogen-substituted lower aliphatic monocarboxylic acids, such as chloroacetic acid, bromoacetic acid, dichloroacetic or trichloroacetic acid, α-chloropropionic acid, β-chloropropionic acid, methoxyacetic acid, cyanoacetic acid or glyoxalic acid. Benzoate, for example, can be used as salts of aromatic carboxylic acids.

Polycarboxylic acids are to be understood as meaning in particular di- and tricarboxylic acids.

Examples of substituted or unsubstituted dicarboxylic acids are malonic acid, succinic acid, glutaric acid, adipic acid, tartaric acid and malic acid. A specific example of a tricarboxylic acid is citric acid.

The organic acids are preferably used in the form of alkali metal or alkaline earth metal salts, in particular as sodium or potassium salts. It is preferable to use solutions of alkali metal or alkaline earth metal salts of lower aliphatic carboxylic acids. Alkali metal acetates and alkali metal formates are particularly suitable. On using solutions of these salts as dialysis solutions, the process of the invention produces the corresponding dye or brightener acetates or formates, which are distinguished by excellent water-solubility.

The concentration of the dye or brightener solution or suspension subjected to ion exchange is advantageously 10 to 500 g/liter, preferably 50 to 300 g/liter. The dialysis solution is generally used in a concentration of 0.5 to 3 molar, preferably about 1 molar. The process is always carried out with an excess of dialysis solution. To achieve, within short periods, the highest possible degree of ion exchange, about 2–20 mols of carboxylic acid salt are used per mol of dye or brightener.

Especially when relatively highly concentrated dialysis solutions are used, the ion exchange is accompanied by enrichment of the dye or brightener solution or suspension. When a 1-molar sodium acetate solution is used, a 0.3- to 0.5-molar dye solution or suspension is stripped of up to 10% of water in the course of 24 hours.

The concentrated dye or brightener solution obtained on carrying out the Donnan dialysis can be converted by drying into a solid dye preparation, if desired after the addition of additives such as binders, dustproofing agents, dispersants and/or extenders. By virtue of the fact that the dye concentration has been increased, the drying consumes less energy. Conventional drying methods are used, in particular spray-drying.

The enriched dye or brightener solution can, however, also be directly processed into a stable liquid formulation. In this case, if desired after addition of additives customary for liquid formulations, such as textile assistants, foam-inhibiting agents, anti-freezes, humectants and/or antimicrobic agents, the dye or brightener solution need only be adjusted to the desired final dye content by dilution and/or by means of extenders.

The dye or brightener preparations are used for preparing dyebaths/brightener baths, padding liquors or print pastes, which are especially suitable for dyeing/brightening or printing textile materials made of natural or synthetic fibres.

The following examples serve to illustrate the invention. The water flow rate through the membrane is given in liter per m$^2$ of membrane area and day [liter/m$^2$.day], and the chloride or sulfate/methosulfate exchange rate—the latter abbreviated to S exchange rate—is given in mol/m$^2$ of membrane area and day [mol/m$^2$.day].

GENERAL PROCEDURE

In each case, 0.5 liter of dye solution or suspension and 2 liters of 1-molar sodium acetate solution are used as starting materials. The two streams of liquid are pumped past the anion exchange membrane, which has an area of 26.42 cm$^2$, and the progress of the ion exchange is monitored by periodic sampling and analysis. Each of the illustrative embodiments below features a tabled summary of the analytical data. In every example, the dye is used in the form of a crude dye which, in addition to pure dye, contains an unquantified amount of inorganic salts whose anions are also replaced in the course of the dialysis.

The backbone of the membrane used in the examples below consists of polyester (comparable results are also obtained with membranes made of polyethylene or based on PVC) coated with an exchange resin which contains quaternary ammonium groups.

EXAMPLE 1

The dye of the formula

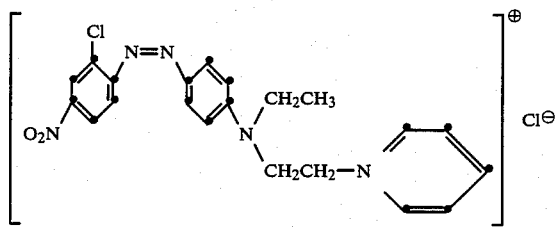

is used in an initial concentration of 210 g/liter. The water outflow through the membrane is 11 liters/m².-day. The final concentration of the dye solution is 270 g/liter, and the acetate content is 0.75 mol/liter.

| Time | measured mean chloride concentration on the dye side | | Chloride exchange rate based on membrane area |
|---|---|---|---|
| hour | g/liter | mol/liter | mol/m² · day |
| 0 | 18.1 | 0.51 | — |
| 8 | 17.2 | 0.48 | 45 |
| 24 | 14.1 | 0.40 | 32 |
| 31 | 9.9 | 0.28 | 33 |
| 72 | 5.1 | 0.14 | 13 |
| 96 | 2.6 | 0.07 | 9 |

EXAMPLE 2

The dye of the formula

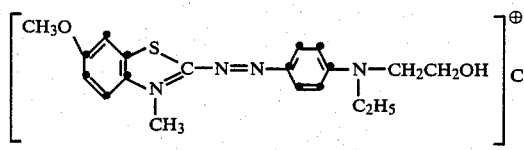

is used in an initial concentration of 200 g/liter. The water outflow rate through the membrane is 14 liters/m².day. The final concentration of the dye solution is 260 g/liter and the acetate content is 0.6 mol/liter.

| Time | measured mean chloride concentration on the dye side | | Chloride exchange rate based on membrane area |
|---|---|---|---|
| hour | g/liter | mol/liter | mol/m² · day |
| 0 | 4.9 | 0.14 | — |
| 24 | 3.87 | 0.11 | 19 |
| 48 | 1.20 | 0.03 | 6 |
| 72 | 0.30 | 0.01 | 1.4 |

EXAMPLE 3

The dye solution subjected to dialysis contains the dye of the formula

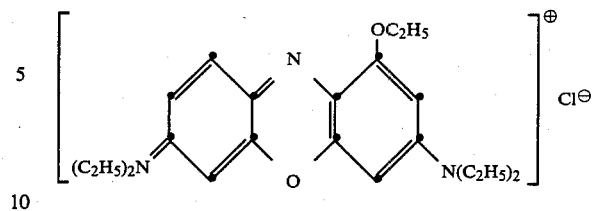

in a starting concentration of about 200 g/liter. The water outflow through the membrane is 14 liters/m².-day. The final concentration of the dye solution is 235 g/liter and the acetate content is 0.6 mol/liter.

| Time | measured mean chloride concentration on the dye side | | Chloride exchange rate based on membrane area |
|---|---|---|---|
| hour | g/liter | mol/liter | mol/m² · day |
| 0 | 4.3 | 0.12 | — |
| 10 | 3.1 | 0.09 | 31 |
| 24 | 1.8 | 0.05 | 16 |
| 48 | 0.4 | 0.01 | 2 |

EXAMPLE 4

The dye of the formula

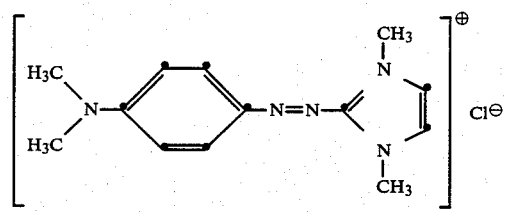

is used in an initial concentration of 50 g/liter. The water outflow rate through the membrane is 10 liter/m².day. When the ion exchange has been carried out, the dye concentration has increased to a value of 64 g/liter. The acetate content of the solution is 0.7 mol/liter.

| Time | measured mean chloride concentration on the dye side | | Chloride exchange rate based on membrane area |
|---|---|---|---|
| hour | g/liter | mol/liter | mol/m² · day |
| 0 | 8.1 | 0.23 | — |
| 3 | 7.4 | 0.21 | 28 |
| 6 | 6.7 | 0.19 | 14 |
| 24 | 4.9 | 0.14 | 14 |
| 48 | 1.6 | 0.04 | 4.6 |

EXAMPLE 5

The dyes of the formulae

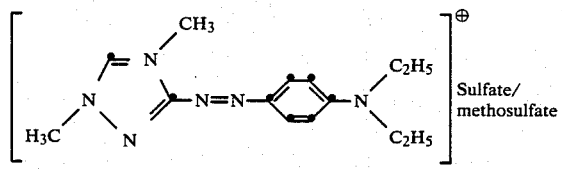

-continued

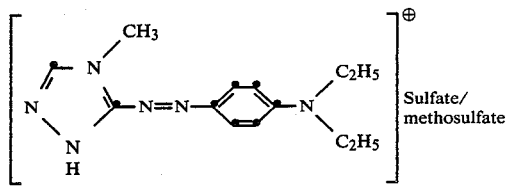

are used as a mixture in a concentration of about 300 g/liter. The final acetate content of the solution is 0.6 mol/liter.

| Time hour | measured mean sulfate/methosulfate concentration on the dye side | | S exchange rate based on membrane area mol/m² · day |
| --- | --- | --- | --- |
| | g of sulfur/liter | mol/liter | |
| 0 | 43.5 | 1.4 | — |
| 48 | 41.1 | 1.3 | 22 |
| 96 | 34.1 | 1.1 | 19 |

EXAMPLE 6

The dye solution subjected to dialysis contains the dye of the formula

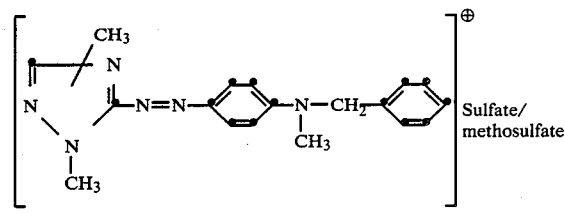

in a concentration of 140 g/liter. The water outflow through the membrane is 10 liters/m².day. In the course of the dialysis, the dye concentration increases to a final value of 180 g/liter. The acetate content of the solution at the end of the dialysis is 0.7 mol/liter.

| Time hour | measured mean sulfate/methosulfate concentration on the dye side | | S exchange rate based on membrane area mol/m² · day |
| --- | --- | --- | --- |
| | g of sulfur/liter | mol/liter | |
| 0 | 14.0 | 0.44 | — |
| 96 | 11.2 | 0.35 | 15 |

EXAMPLE 7

The dye solution obtained in Example 2, which contains the dye in the form of an acetate, can be directly used as a liquid formulation. The formulation is stable—unchanged after storage for 45 days at room temperature or at 40° C.—and produces on acrylic yarn a shade 40% deeper than that of the untreated dye suspension, in which the dye is in the form of a chloride.

EXAMPLE 8

A portion of the dye solution obtained in Example 2 is admixed with 10% by weight, based on dye, of dextrin, and is dried by means of a laboratory spray-dryer. This gives a solid dye preparation which has excellent cold-water solubility, dissolving at once on sprinkling into cold water.

EXAMPLE 9

500 ml of a 10% aqueous suspension of the fluorescent brightener of the formula

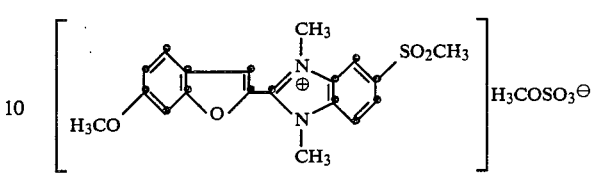

are subjected to the Donnan dialysis in an exchange cell having a membrane area of 38 cm². The dialysis solution used is 2 liters of a 1-molar sodium acetate solution. At the start of the dialysis the methosulfate content in the brightener suspension is 2.37 g/liter. The dialysis is continued for 5 days and the methosulfate content is then found to be only 0.45 g/liter, while the acetate content is found to be 21.4 g/liter. This corresponds to an exchange proportion of 86%.

When the sodium acetate solution is replaced by 2 liters of 1-molar acetic acid, 5 days later the methosulfate content is found to be 1.14 g/liter and the acetate content 44.3 g/liter, which corresponds to an exchange proportion of 56%.

What is claimed is:

1. A process for converting sparingly soluble inorganic salts of cationic dyes and brighteners into more soluble salts of organic acids without intermediate isolation of the free base, which comprises replacing the inorganic acid radical of the dye or brightener by the anion of a cyclic or acyclic organic acid by means of Donnan dialysis.

2. The process of claim 1, wherein the sparingly soluble inorganic salts of said cationic dyes and brighteners are selected from the group consisting of chlorides, sulfates, and methosulfates.

3. The process according to claim 1, wherein the Donnan dialysis is carried out in an exchange cell in which a dye or brightener solution or suspension and a dialysis solution are separated from each other by a semipermeable membrane, and the two solutions, or the suspension and solution are passed along the surface of the membrane.

4. The process according to claim 3, wherein the semipermeable membrane used is an anion exchange membrane whose polymer backbone has been modified by polyfunctional compounds containing ionic groups and whose pores have a diameter of 0.1 to 50 μm.

5. The process according to claim 3, wherein the concentration of the dye or brightener solution or suspension is 10 to 500 g/liter, and the dialysis solution is 0.5- to 3-molar.

6. The process of claim 1, wherein an aqueous dialysis solution is used in said Donnan dialysis, which solution contains an inorganic salt of an acid selected from the group consisting of cyclic monocarboxylic, acyclic monocarboxylic, cyclic polycarboxylic, and acyclic polycarboxylic acids, said acid being unsubstituted or substituted with substituents selected from the group consisting of hydroxyl, halogen, $C_1$–$C_4$ alkoxy, nitro, amino, cyano, and oxo, and, in the case wherein said acid is an aromatic acid, a further member of said substituent group is $C_1$–$C_4$ alkyl.

7. The process of claim 6, wherein the aqueous dialysis solution contains a salt selected from the group consisting of alkali metal and alkaline earth metal salts of lower aliphatic carboxylic acids.

8. The process according to claim 7, wherein said salt is selected from the group consisting of an alkali metal acetate and alkali metal formate.

9. The process according to claim 1, wherein the ion exchange is accompanied by enrichment of the dye or brightener solution or suspension.

10. The concentrated dye or brightener solution obtained by the process of claim 1.

11. A method of preparing a solid or liquid dye or brightener preparation which comprises mixing a concentrated dye or brightener solution of claim 10 with conventional further additives.

* * * * *